April 10, 1962 — W. E. PARKER ET AL — 3,029,067
VARIABLE AREA NOZZLE MEANS FOR TURBINES
Filed May 31, 1956 — 2 Sheets-Sheet 1

WILTON E. PARKER,
WILLIAM D. WHITAKER,
INVENTORS.

BY JOHN H. G. WALLACE.

WILTON E. PARKER,
WILLIAM D. WHITAKER,
INVENTORS.

BY

JOHN H. G. WALLACE.

3,029,067
VARIABLE AREA NOZZLE MEANS
FOR TURBINES
Wilton E. Parker, Encino, Calif., and William D. Whitaker, Phoenix, Ariz., assignors to The Garrett Corporation, Los Angeles, Calif., a corporation of California
Filed May 31, 1956, Ser. No. 588,397
6 Claims. (Cl. 253—52)

The present invention relates to a variable area nozzle means for turbines, and more particularly to an improvement in variable area nozzle means of the type having pivoted vanes and mechanism disposed exteriorly of the turbine casing for effecting the adjustment of the vanes.

During operation of variable area nozzles of the types previously provided, various difficulties have been encountered in the actuation of the nozzle vanes. Some of these difficulties have been caused by the effects of temperatures which change the relationships of nozzle vanes and actuating parts in connection therewith. For example, in variable area nozzle mechanisms used on high temperature turbines, expansion of the operating parts of the mechanism sometimes causes one or more of the nozzle vanes, or other parts in connection therewith, to stick and stall the actuators which prevents all of the remaining nozzle vanes from operating properly.

In addition, it has previously been difficult to obtain proper actuation of variable area nozzle vanes in order to maintain fine speed control of a turbine.

In centripetal turbines of the type having substantially annular inlet scrolls, variable nozzle vanes must be utilized to change the direction of flow of gas entering the turbine through a fairly wide angular range. Heretofore this function has caused the variable nozzle vanes to be provided with considerable camber which imposed excessive structural bulk in the nozzle flow area. Furthermore, large nozzle vanes are exposed to excessive aerodynamic stresses which impose high bearing loads thus requiring the exertion of undue forces to effect the variation in area of the nozzles.

It is an object of the invention provide a variable area nozzle means for turbines wherein shear pins are employed to connect pivoted nozzle vanes and the actuating mechanism therefore, whereby the sticking of a single nozzle vane will cause a shear pin in connection therewith to fail, permitting the remaining nozzle vanes to be properly actuated.

Another object of the invention is to provide a variable area nozzle means for turbines wherein shear pins are employed to connect pivoted nozzle vanes and the actuating mechanism therefor, and wherein stop means prevent the nozzle vanes from pivoting beyond a predetermined degree subsequent to a shearing action of any of said shear pins, whereby nozzle vanes thus disconnected from the actuating mechanism cannot pivot into the path of the turbine wheel rotating adjacent to the nozzles.

Another object of the invention is to provide a variable area nozzle means for turbines, such nozzle means having parts which are precisely assembled, said means also having freedom to compensate for thermally induced changes of the parts relative to each other.

Another object is to provide a variable area nozzle means having an annular row of pivoted nozzle vanes surrounding a turbine wheel, and a ring for actuating said nozzle vanes, whereby a single actuator connected to said ring is capable of exerting a predetermined maximum force on any one of said nozzle vanes in the event it tends to stick in any position.

Another object of the invention is to provide a variable area nozzle means having actuating mechanism which tends to establish a force balance about the axis of pivotally mounted nozzle vanes, said balance existing between nozzle actuator force and aerodynamic forces acting on the nozzle vanes.

Another object of the invention is to provide a variable area nozzle means for turbines, such means having guide vanes at the inlet of nozzle vanes pivotally mounted around the inlet of a turbine wheel, whereby the configuration of the nozzle vanes may be compact for efficiency and structural durability.

Another object of the invention is to provide a variable area nozzle means for turbines, the nozzle means including an actuated toggle means which approaches an overcenter position when nozzle vanes of said means approach a closed position relative to each other, whereby greater or lesser actuation of said toggle means corresponds respectively with lesser or greater movement of said nozzle vanes at the approach of closed or open positions respectively thereof.

Further objects and advantages of the invention will be apparent from the following specification, appended claims and accompanying drawings, in which:

Figure 1:
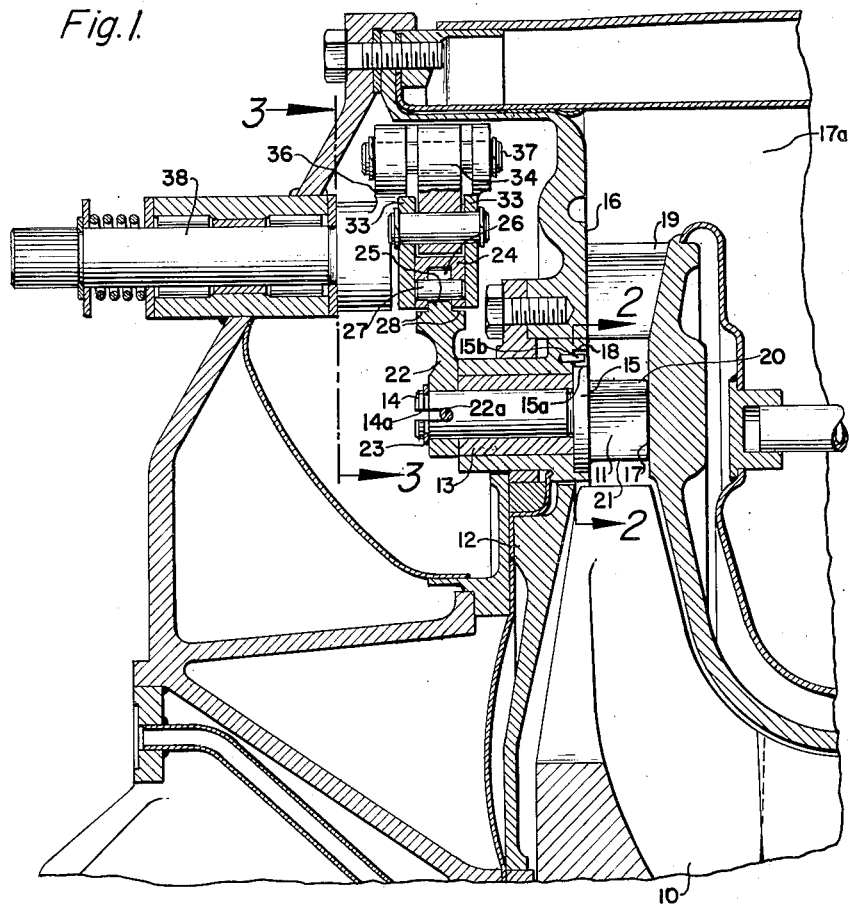
FIG. 1 is a fragmentary axial sectional view of a gas turbine having a variable area nozzle means according to the present invention.
Figure 3:
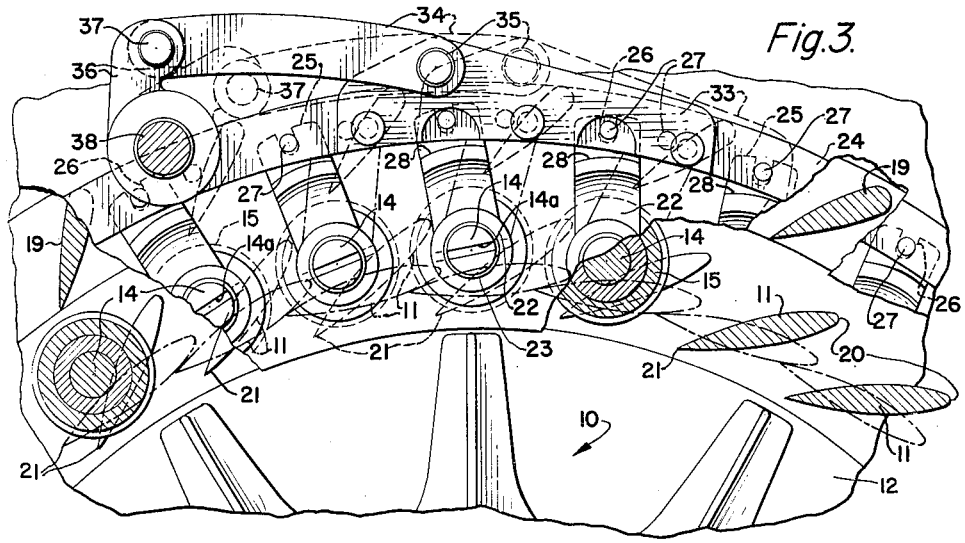
FIG. 3 is a fragmentary sectional view taken from the line 3—3 of FIG. 1 and illustrating by broken lines varying positions of the variable area nozzle means.

As shown in FIGS. 1 and 3, a centripetal turbine wheel 10 is surrounded by an annular row of pivoted nozzle vanes 11. A frame structure 12 rotatably supports the wheel 10 and holds bushings 13 in which nozzle vane shafts 14 are pivotally mounted. These shafts 14 may be integral with the nozzle vanes 11 or secured thereto in any suitable manner as desired. Fixed to each shaft 14 is an enlarged disc 15 on which one of the vanes 11 is fixed.

Figure 2:
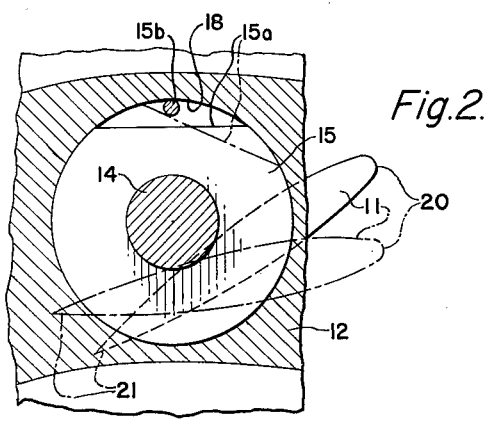
FIG. 2 is a fragmentary sectional view taken from line 2—2 of FIG. 1, showing stop means for the pivoted nozzle vanes of the variable area nozzle means.

Referring to FIG. 2 of the drawings, it will be seen that the discs 15 are provided with chordally disposed notches 15a, which receive pins 15b projecting from the frame 12. These pins 15b prevent undue pivotal movement of the vanes 11 and prevent them from pivoting into the path of the turbine wheel 10 in the event of a failure of the nozzle actuating mechanism, as will be hereinafter described in detail.

Annular wall structures 16 and 17 confine the nozzle vanes 11 axially of the shafts 14. The discs 15 are contained in recesses 18 in the wall 16, and the vanes 11 are substantially co-extensive with the space between the walls 16 and 17, but are provided with slight working clearance relative thereto. The space between the walls 16 and 17 provides an inlet passage from a plenum 17a to the turbine wheel 10. Positioned between the walls 16 and 17 and at the inlet to the nozzle vanes 11 are stationary guide vanes 19. The guide vanes 19 and the nozzle vanes 11 have no camber, since the desired turning angles of fluid entering the turbine wheel 10 are provided for by combining functioning of the guide vanes 19 and nozzle vanes 11. The stationary guide vanes 19, being located at the inlet to the nozzle vanes 11, accomplish preliminary turning of fluid in a direction toward the turbine wheel 10. Thus, the nozzle vanes 11 receive fluid in a direction which permits efficient operation of the nozzle vanes throughout their angular range of variable adjustment. Due to the preliminary turning function afforded by the guide vanes 19, the nozzle vanes are only required to accomplish flow turning through a nominal angular range and do not need lengthy cambered structure. The nozzle vanes, therefore, may be compact, structurally durable, and easily balanced.

Due to compactness of the nozzle vanes 11, frictional area thereof and aerodynamic loading thereon is maintained at a minimum, all of which reduce the force required to actuate the nozzle vanes. The mean chord lines of the nozzle vanes 11 are disposed laterally of the axes of the shafts 14 and said axes are disposed intermediate the leading and trailing edges 20 and 21 of the nozzle vanes 11. The axes of the shafts 14 are disposed slightly nearer the trailing edges of the vanes 11, whereby areodynamic forces normally tend to pivot the nozzle vanes into the closed position indicated by broken lines in FIG. 3, thereby providing a fail-safe arrangement of the nozzles, which prevents overspeed of the turbine in the event the variable nozzle actuating mechanism fails.

The shafts 14 are provided with slots 14a in the ends thereof which project away from the nozzle vanes 11. Positioned in these slots are shear pins 22a which extend through arms 22 carried by the shafts 14. The shear pins 22a provide a release mechanism in case of seizure between one or more of the shafts 14 and bushings 13. The arms 22 are axially retained on the shafts 14 by means of conventional snap rings 23. Thus, the ends of bushings 13, are engageable by the disc portions 15 and the arms 22. Slight clearance is provided at opposite ends of the bushing 13 to permit operating freedom of the nozzles 11, discs 15, shafts 14 and arms 22. The arms 22 extend away from the axis of the turbine wheel 10 and support a resilient nozzle actuating ring 24.

The resilient ring 24 is channel-shaped in cross-section and the open side of the channel structure thereof is directed inwardly toward the arms 22. The resilient ring 24, in addition, is preferably formed of a metal such as steel or aluminum or an alloy thereof which will allow it to distort slightly from its circular shape when it is forced outwardly at four circumferentially spaced points by the expansion of the frame structure as will be described later. The resilient ring 24 should be designed to return to a circular shape after the force causing it to expand is removed. The arms 22 are each provided with an end portion 25, which extends into the channel of the ring 24. Each of the end portions 25 is provided with a slot 26 which engages a pin 27 carried by the ring 24 and spanning the channel structure thereof. The arms 22 are provided with ledges 28 which are engageable with the inwardly extending edges of the channel structure of the ring 24. These ledges 28 are herein referred to as engaging portions which support the nozzle actuating ring 24.

Figure 4:
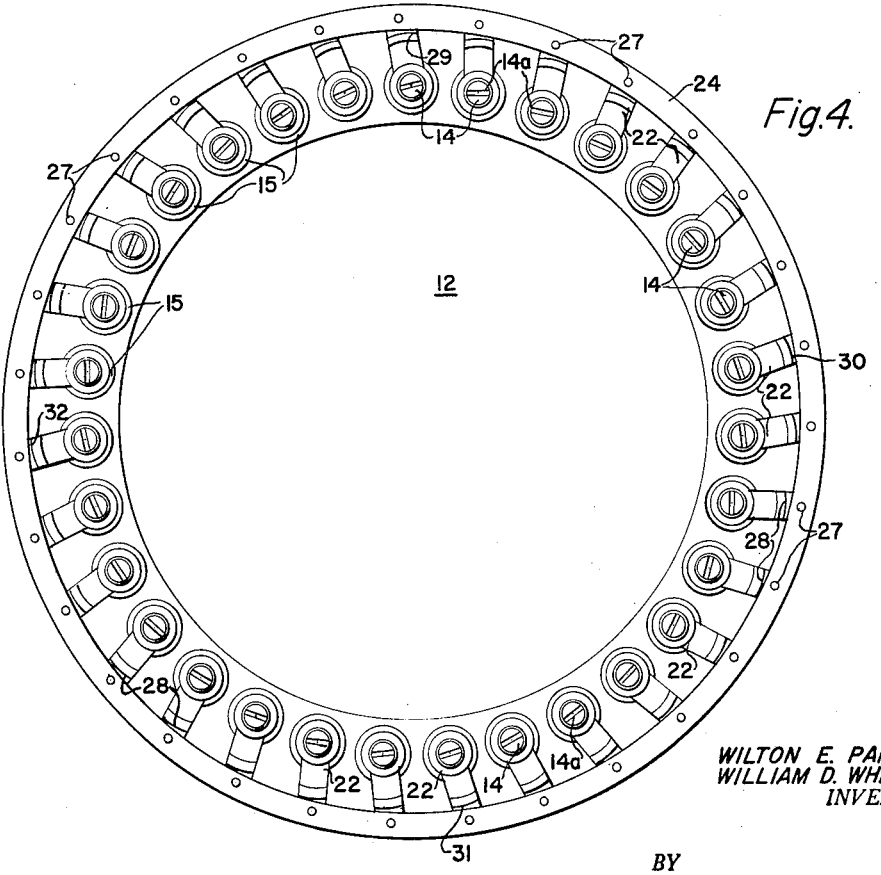
FIG. 4 is a diagrammatic view of an annular row of nozzle vane actuating arms and an actuating ring in operable relationship with the arms.

Referring to FIG. 4 of the drawings, it will be seen that the shafts 14 and arms 22 are arranged in an annular row coinciding with that of the nozzle vanes 11, which surround the turbine.

In order to alleviate the effects of thermal expansion of the frame 12, relative to that of the ring 24, ledges 28 of only four of the arms 22 engage the ring 24 under normal ambient temperature conditions. These engaging ledges 28 are disposed at locations 29, 30, 31 and 32. When the temperature of the frame 12 increases during operation of the turbine, thermal expansion of the frame is great relative to that of the ring 24, which causes the arms 22 to be extended radially from the axis of the turbine wheel 10. In order to compensate for the radial displacement of the arms 22 relative to the ring 24, the ledges 28 of the arms 22 intermediate the locations 29, 30, 31 and 32 are positioned at a shorter radius from the axis of the turbine wheel 10 than are the ledges of the arms 22 at the locations 29, 30, 31 and 32. The ledges 28 positioned between the locations 30 and 31, for example, are provided with considerable clearance relative to the ring 24 when normal ambient temperatures exist in the entire machine. The ledges 28 at median positions between the locations 30 and 31 are disposed on the shortest radius from the axis of the turbine wheel 10, while like radii on the remaining ledges 28 are gradually stepped from the median position toward each of the locations 30 and 31. The above described graduation of radii of the ledges 28 applies to all of the arms between the locations 29, 30, 31 and 32.

It will be understood that thermal expansion of the frame 12, when it forces the arms 22 outwardly at locations 29, 30, 31 and 32, tends to deflect the ring 24. Deflection of the ring 24 causes tension therein intermediate the locations 29, 30, 31 and 32, whereupon the ring 24 intermediate these locations tends to be pulled inwardly toward the ledges 28 intermediate said locations. Thus, when the turbine 10 is operating at extremely high temperatures, the ring 24 may be forced into close proximity to all of the ledges 28 carried by the arms 22.

Attention is directed to FIG. 3, which discloses details of the nozzle actuating mechanism. Connected to the ring 24 are brackets 33 having a toggle link 34 pivotally connected thereto by means of a pin 35. The opposite end of the toggle link 34 is pivotally connected to a bell crank lever 36 by means of a pin 37. The bell crank lever 36 is carried by a shaft 38, which may be connected to a suitable actuating device as desired.

It will be seen from FIG. 3 wherein the solid-line position of the toggle mechanism, including the link 34 and lever 36, corresponds to a fully open position of the nozzle vanes 11, that such vanes are substantially aligned with the stationary guide vanes 19. In this condition slight modulating action of the nozzle vanes 11 may be accomplished by slight movement of the shaft 38. When the nozzle vanes 11 are near the closed position, as shown by broken lines in FIG. 3, a relatively greater movement of the shaft 38 is required to obtain comparable angular movement of the nozzle vanes 11. Thus, the toggle mechanism tends to provide for a proportional angular change of the nozzle vanes 11, relative to the flow area thereof in various degrees of open or closed position thereof.

When the turbine wheel 10, as shown in FIG. 1 of the drawings, is operated as a gas turbine motor, for example, hot gases in the plenum 17a pass inwardly to the turbine wheel intermediate the walls 16 and 17. The guide vanes 19 turn the gases and direct them toward the nozzle vanes 11. This function, as hereinbefore described, permits the nozzle vanes 11 to be structurally compact, durable and easily balanced. The flow of gases intermediate the nozzle vanes 11 is controlled by pivotal action thereof. The entrance angle of the gases flowing to the turbine 10, as well as the volume flow thereof, is varied by pivotal movement of the nozzle vanes 11 within a range of angular movement, as disclosed in FIG. 3 of the drawings, wherein fully open and fully closed positions of these nozzles is illustrated by solid and broken-line positions respectively. A speed responsive actuator of suitable characteristics (not shown) is connected to the shaft 38 and operates the toggle elements 34 and 36, as hereinbefore described. This is accomplished automatically by well-known control elements which form no part of the present invention.

The variable nozzle vanes 11 are automatically modulated to control speed in response to load changes in connection with the turbine wheel 10, or in response to variations in pressure and/or temperature of the gases entering the turbine 10 by the plenum 17a. When the turbine is operating under high temperatures, the nozzle vanes 11 and shafts 14 operate under very critical conditions and in the event any one of the nozzle vanes 11 or shafts 14 becomes stuck, the shear pin 22a in connection with the respective shaft 14 will be sheared off by a force exerted on the respective arm 22, whereupon all of the other nozzle vanes 11 will continue to operate in a normal manner. The ring 24 being a resilient flexible structure, and having a single actuator applying force to the bracket 33, is capable of concentrating substantially all of the actuating power supplied to the shaft 38 on any single nozzle 11 which may stick. As shown in FIG. 4 of the drawings and as hereinbefore described, it will be apparent that the ring 24 may be deflected inwardly between the locations 29, 30, 31 and 32, in order to suitably engage ledges 28 of the arms 22. When actuating force is applied to the ring 24, it has a tendency to revolve around the axis of the turbine wheel during each application of force to the bracket 33. The spacing between the ring 24 and the ledges 28 on all of the arms 22 except those at locations 29, 30, 31 and 32, permits the ring to deform in response to the expansion of the turbine wall 16 and thus prevent the application of binding forces to the shafts 14.

In the event one of the shear pins 22a is sheared off, due to sticking of a nozzle vane 11, and in the event the nozzle vane subsequently becomes free, the pin 15b when engaged by a wall of the chordal notches 15a, as shown in FIG. 2 of the drawings, prevents the leading edge of the nozzle vane 11 from pivoting downwardly to a position in which it would engage the turbine wheel 10.

Various modifications of the present invention may be resorted to in a manner limited only by a just interpretation of the following claims.

We claim:

1. A variable area nozzle for turbines comprising: frame means spaced to provide an annular turbine inlet passage; nozzle vanes supported in said frame means for rotary adjustment about axes spaced circumferentially relative to and extending transversely of said passage to vary the effective area thereof; actuating means for said nozzle vanes having lever arms connected with said vanes for moving the same about said axes, each vane having one arm provided therefor; and an actuating ring in motion transmitting connection with said arms, said ring being in supporting engagement with predetermined arms spaced around the axis of rotation of the turbine wheel, the arms in supporting engagement with said ring being spaced from one another sufficiently and said ring normally being sufficiently free from supporting engagement with the arms disposed between said predetermined arms to permit inward movement of said ring between the arms in supporting engagement therewith upon thermal expansion of said frame means.

2. A variable area nozzle for turbines comprising: frame means spaced to provide an annular turbine inlet passage; nozzle vanes supported in said frame means for rotary adjustment about axes extending transversely of said passage to vary the effective area thereof; actuating means for said nozzle vanes having lever arms connected with said vanes for moving the same about said axes, each vane having one arm provided therefor; a ledge formed adjacent the outer extremity of each arm; and an actuating ring in motion transmitting connection with said arms, predetermined arms located at selected points spaced around the axis of rotation of the turbine wheel having the ledges thereof disposed to engage and form the sole support of said actuating ring, the points of engagement of the ledges of said predetermined arms and said ring being spaced sufficiently and the ledges of the remaining arms being spaced sufficiently from said ring to permit inward flexing of said ring between said points of engagement upon thermal expansion of said frame means.

3. A variable area nozzle for turbines comprising: frame means spaced to provide an annular turbine inlet passage; nozzle vanes supported in said frame means for rotary adjustment about axes extending transversely of said passage to vary the effective area thereof; actuating means for said nozzle vanes having lever arms for moving said vanes about said axes, each vane having one arm provided therefor; frangible means connecting said arms and said vanes, said frangible means serving to permit operation of said actuating means in event of excessive resistance to movement by any vane; stop means supported by said frame means for each vane to limit the extent of adjustment thereof; and an actuating ring in motion transmitting connection with said arms, said ring being supported solely by direct engagement with predetermined arms disposed at predetermined points spaced around the axis of rotation of the turbine wheel, the spacing of the points of engagement of said arms and ring being sufficient and said ring being free from supporting engagement with the arms disposed between said predetermined arms to permit limited inward flexing of said ring between said points upon thermal expansion of said frame means.

4. A variable area nozzle for turbines comprising: frame means spaced to provide an annular turbine inlet passage; a plurality of stationary guide vanes extending transversely of said inlet passage, said guide vanes being circumferentially spaced and inclined to direct fluid inwardly along predetermined paths; an equal number of nozzle vanes with leading and trailing edges supported in said frame means for rotary adjustment about axes spaced circumferentially relative to and extending transversely of said inlet passage, said nozzle vanes being adjustable between an open position substantially in alignment with the respective guide vanes and a closed position in which the leading edges of the nozzle vanes overlap the trailing edges of adjacent vanes, the axis of adjustment for each vane being disposed at the opposite side thereof from the axis of the turbine and closer to the trailing edge than to the leading edge; means for actuating said nozzle vanes, said actuating means having a lever arm for each vane; an actuating ring in motion transmitting connection with said arms; and means on a plurality of said lever arms for supporting engagement with the inner side of said ring at points spaced substantially equally therearound, said ring normally being free from supporting engagement with the majority of the arms between said points, the spacing of said points of supporting engagement being sufficient to permit inward flexing of said ring therebetween in response to thermal expansion of said frame means.

5. A variable area nozzle for turbines comprising: frame means spaced to provide an annular turbine inlet passage; nozzle vanes supported in said frame means for rotary adjustment about axes spaced circumferentially relative to and extending transversely of said passage to vary the effective area thereof; actuating means for said nozzle vanes having lever arms connected with said vanes for moving the same about said axes, each vane having one arm provided therefor; an actuating ring in motion transmitting connection with said arms; and ring supporting means on at least two arms spaced substantially equally around said frame, said ring normally being free from supporting engagement with the majority of the arms between those in actual supporting engagement, such supporting arrangement permitting inward flexing of said ring between the arms in actual supporting engagement in response to thermal expansion of said frame means.

6. A variable area nozzle for turbines comprising: frame means spaced to provide an annular turbine inlet passage; nozzle vanes supported in said frame means for rotary adjustment about axes spaced circumferentially relative to and extending transversely of said passage to vary the effective area thereof; actuating means for said nozzle vanes having lever arms connected with said vanes for moving the same about said axes, each vane having one arm provided therefor; an actuating ring in motion transmitting connection with said arms; and ledge means formed on said arms, the ledge means on at least two arms spaced substantially equally around said ring being spaced a greater distance from the center of said ring than the ledges on the other arms to engage and support said ring at points spaced sufficiently to permit said ring to flex inwardly between such points upon thermal expansion of said frame means.

(References on following page)

References Cited in the file of this patent

UNITED STATES PATENTS

| | | |
|---|---|---|
| 1,570,536 | Syvertsen | Jan. 19, 1926 |
| 1,584,915 | Bentley | May 18, 1926 |
| 1,609,158 | Dake | Nov. 30, 1926 |
| 2,044,435 | Ljungstrom | June 16, 1936 |
| 2,125,946 | Norbom | Aug. 9, 1938 |
| 2,715,814 | Barr | Aug. 23, 1955 |
| 2,733,853 | Trumpler | Feb. 7, 1956 |
| 2,739,782 | White | Mar. 27, 1956 |
| 2,930,579 | Boyd et al. | Mar. 29, 1960 |

FOREIGN PATENTS

| | | |
|---|---|---|
| 171,139 | Great Britain | Nov. 17, 1921 |
| 309,135 | Great Britain | Dec. 19, 1929 |
| 738,987 | Great Britain | Oct. 26, 1955 |
| 1,107,512 | France | Aug. 10, 1955 |